US006786031B2

(12) United States Patent
Kalista et al.

(10) Patent No.: US 6,786,031 B2
(45) Date of Patent: Sep. 7, 2004

(54) JACK FOR POWER IMPLEMENT

(75) Inventors: Kari Ann Kalista, Kiel, WI (US); Daniel J. Gindt, Hortonville, WI (US); Brian K. Gloudemans, Little Chute, WI (US); John Porter, Reedsville, WI (US); Robert Busse, Reedsville, WI (US); Paul A. Schroeder, Manitowoc, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/264,688

(22) Filed: Oct. 4, 2002

(65) Prior Publication Data

US 2004/0065071 A1 Apr. 8, 2004

(51) Int. Cl.[7] .......................... A01D 67/00; A01D 34/00
(52) U.S. Cl. ....................................................... 56/16.7
(58) Field of Search ................................ 56/14.7, 14.9, 56/15.1, 15.2, 15.3, 15.9, 15.7, 16.7, 17.2, DIG. 22; 180/208, 216; 280/48.13, 287

(56) References Cited

U.S. PATENT DOCUMENTS

| | | |
|---|---|---|
| 2,251,293 A | 8/1941 | Schwartz et al. |
| 4,061,309 A | 12/1977 | Hanser |
| 4,150,813 A | 4/1979 | Mena |
| 5,219,429 A | 6/1993 | Shelton |
| 5,232,206 A | 8/1993 | Hunt et al. |
| 5,465,940 A | 11/1995 | Guzman et al. |
| 5,475,971 A * | 12/1995 | Good et al. .................. 56/14.9 |
| 5,636,830 A | 6/1997 | Chartrand |
| 5,816,035 A * | 10/1998 | Schick ........................ 56/15.2 |
| 6,076,855 A * | 6/2000 | Webb ....................... 280/765.1 |
| 6,135,422 A | 10/2000 | Thomas |
| 6,516,597 B1 * | 2/2003 | Samejima et al. ........... 56/16.7 |

OTHER PUBLICATIONS

Toro, Count on it, Landscape Contractor Equipment Literature by The Toro Company, 2001.

* cited by examiner

Primary Examiner—Robert E Pezzuto
(74) Attorney, Agent, or Firm—Michael Best & Friedrich LLP

(57) ABSTRACT

A lawnmower comprising a chassis and a mower deck movable with respect to the chassis. A cylinder assembly is mounted to the chassis, and includes an actuating cylinder, and a piston shaft selectively extendable and retractable with respect to the cylinder under the influence of fluid pressure within the cylinder. A deck lift assembly is interconnected to the chassis and the mower deck for adjusting the height of the mower deck with respect to the chassis. The deck lift assembly includes a pivot member pivotally connected to the chassis. A jack is removably coupled to the pivot member, such that the chassis is raised and lowered in response to movement of the piston shaft with respect to the cylinder. The jack utilizes the existing hydraulic system and cylinder assembly of the lawnmower to raise the lawnmower with respect to the ground.

22 Claims, 5 Drawing Sheets

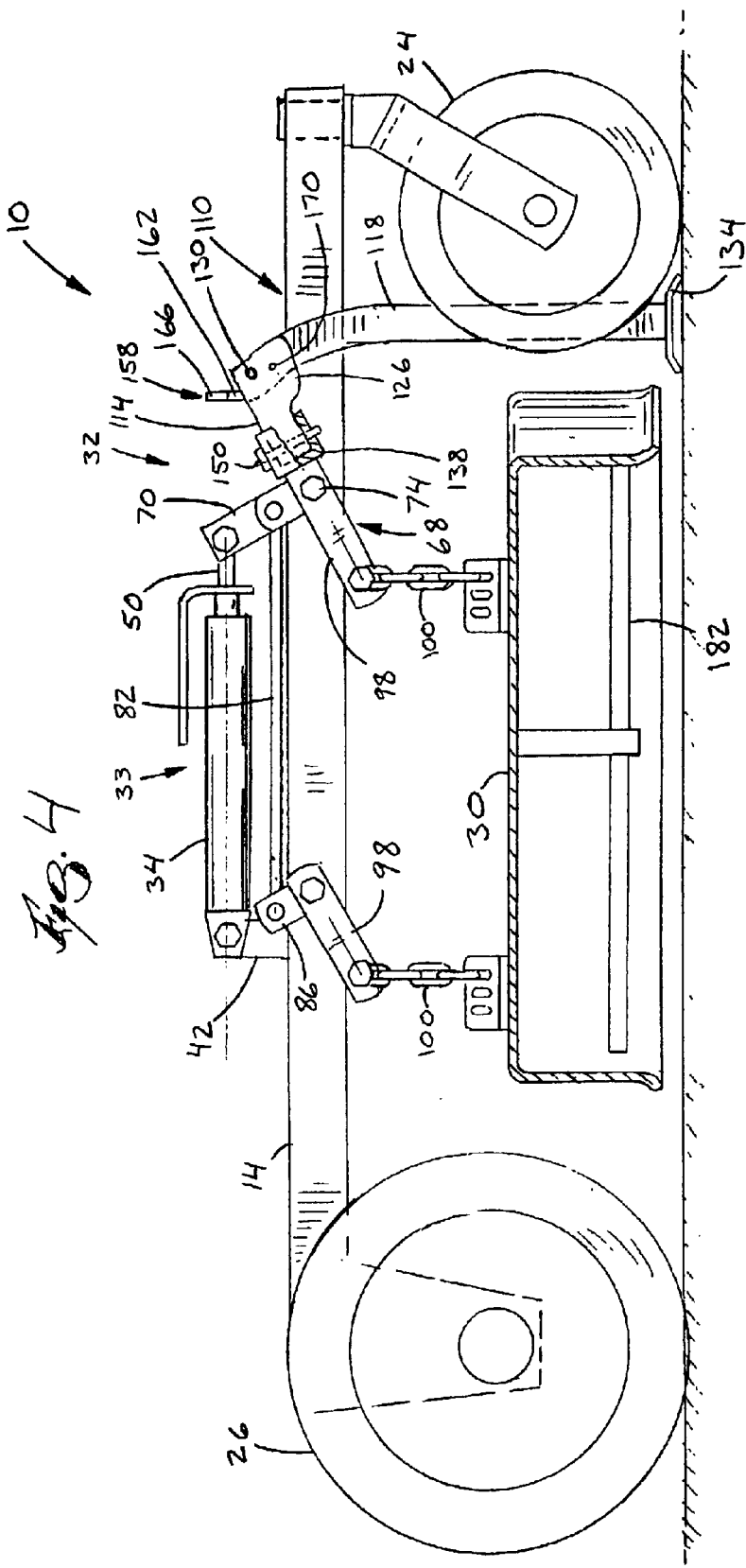

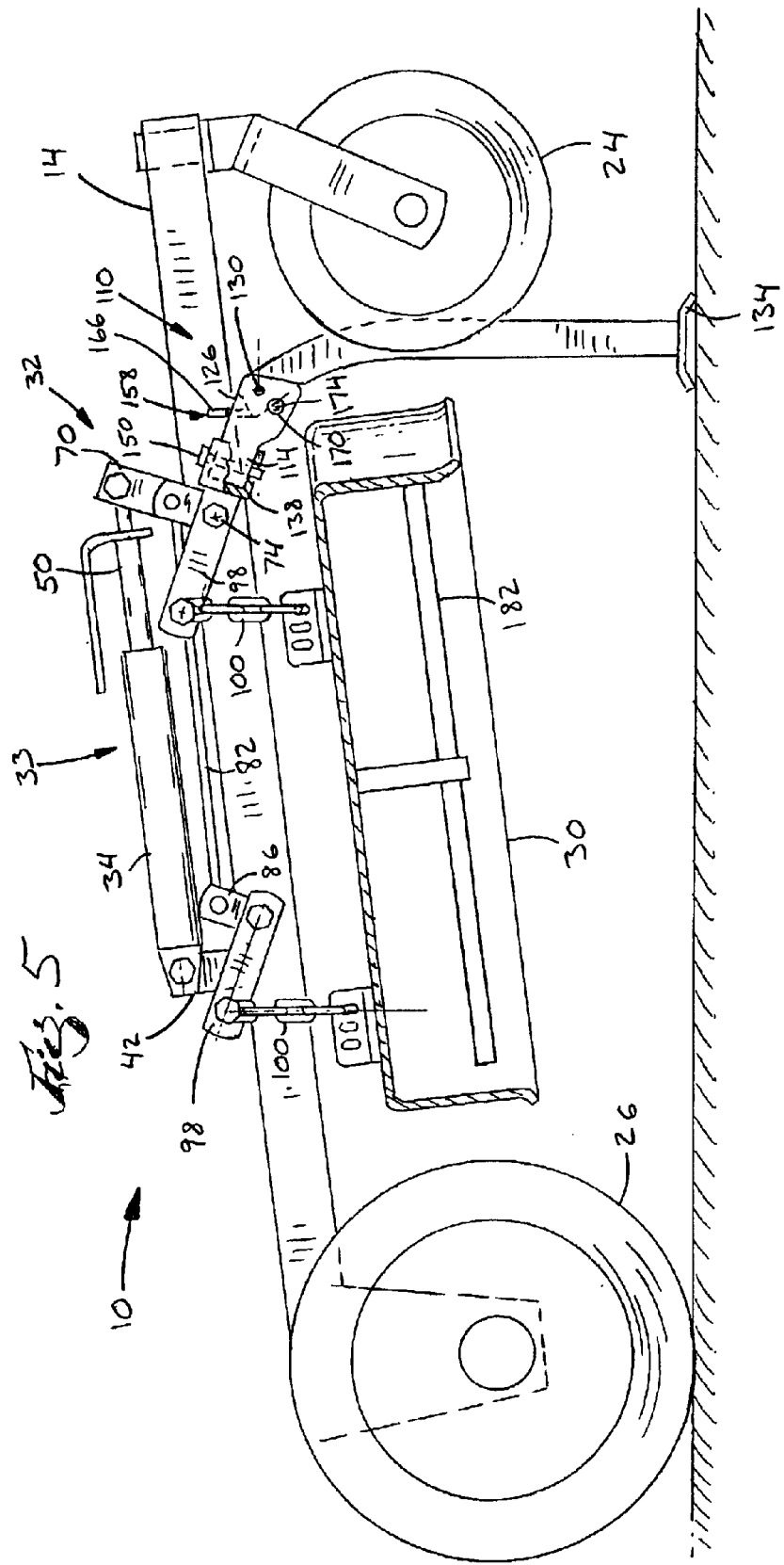

JACK FOR POWER IMPLEMENT

FIELD OF THE INVENTION

This invention relates to a jack device for power implements such as utility tractors, lawnmowers, landscaping equipment, trimmers, tillers, snow throwers, or other similar implements.

BACKGROUND OF THE INVENTION

Power implements commonly include devices such as utility tractors, lawnmowers, landscaping equipment, trimmers, tillers, snow throwers, or other similar implements, and are used for general outdoor applications such as landscaping, gardening, lawn care, or snow removal. Lawnmowers generally include a cutting blade rotating near the ground to cut vegetation, and a mower deck or protective housing that encloses the rotational path of the cutting blade. Access to the mower deck, cutting blades or underside of the lawnmower is often required to perform regular maintenance on the lawnmower. Lawnmowers, particularly riding lawnmower and lawn tractors, are relatively heavy. A jack may be used to lift a portion of the lawnmower to provide access under the lawnmower and to the cutting blade.

SUMMARY OF THE INVENTION

The present invention provides a lawnmower comprising a chassis and a mower deck movable with respect to the chassis. A cylinder assembly is mounted to said chassis, and includes an actuating cylinder, and a piston shaft selectively extendable and retractable with respect to the cylinder under the influence of fluid pressure within the cylinder. A deck lift assembly is interconnected to the chassis and the mower deck for adjusting the height of the mower deck with respect to the chassis. The deck lift assembly includes a pivot member pivotally connected to the chassis. A jack is removably coupled to the pivot member, such that the chassis is raised and lowered on the jack in response to movement of the piston shaft with respect to the cylinder. The mower deck is raised with respect to the chassis simultaneously as the chassis is raised with respect to a ground surface.

Independent features and independent advantages of the present invention will become apparent to those skilled in the art upon review of the following detailed description and drawings.

BRIEF DESCRIPTION OF THE DRAWINGS

FIG. 4 is a side view of the lawnmower of FIG. 1, illustrating the lawnmower in a lowered position.

FIG. 5 is a side view of the lawnmower of FIG. 1, illustrating the lawnmower in a raised position.

Figure 1:
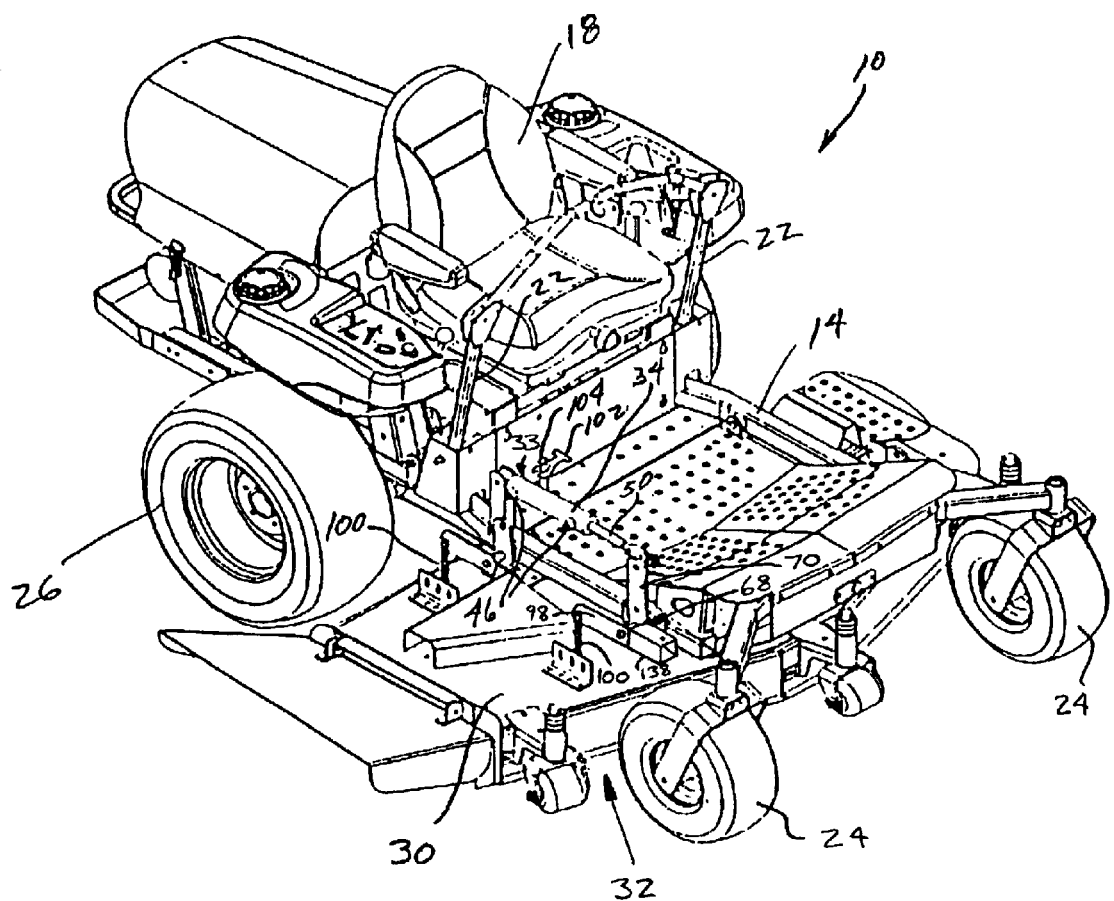
FIG. 1 is a perspective view of a lawnmower embodying the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
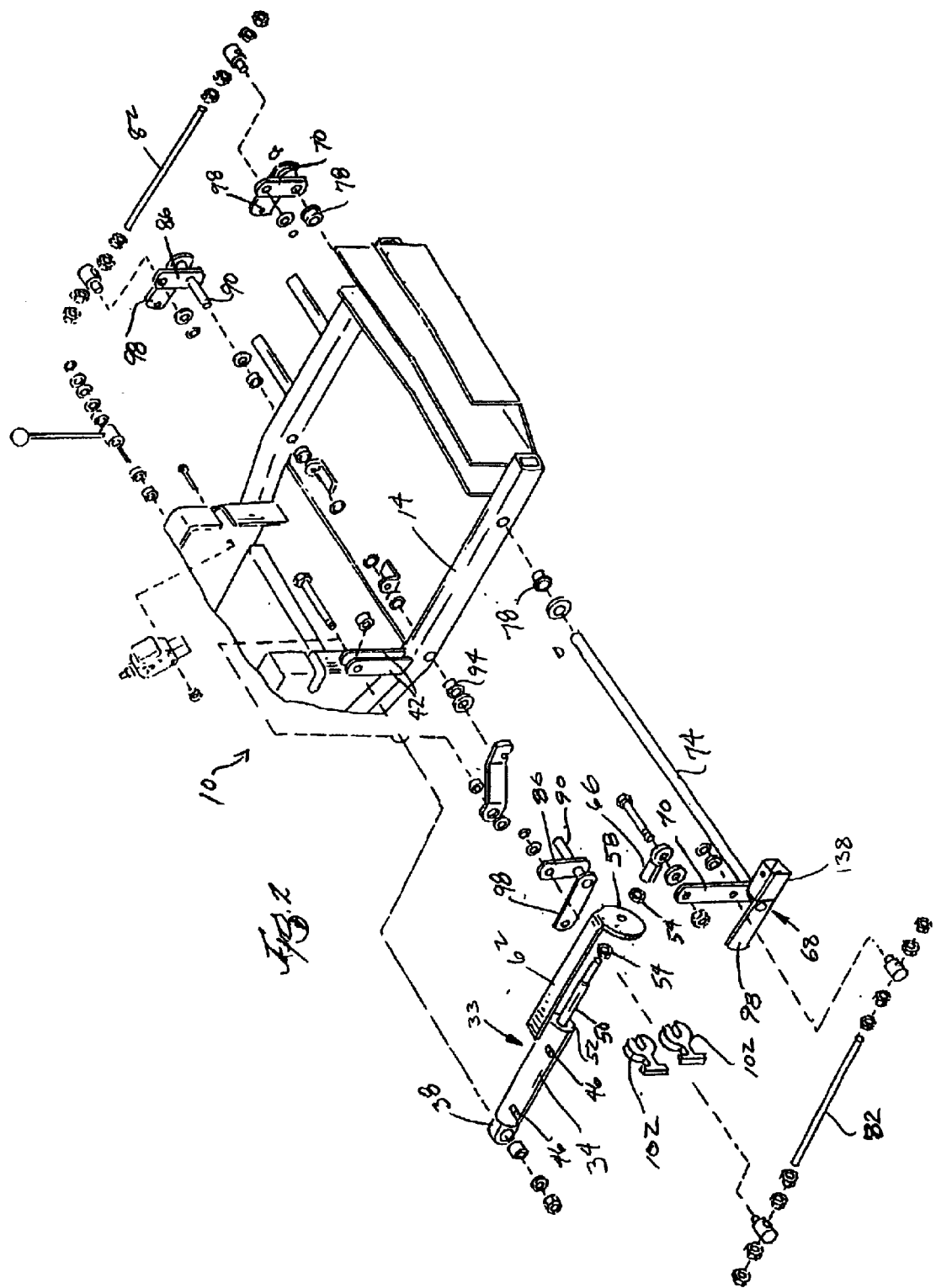
FIG. 2 is an assembly view of a portion of the lawnmower of FIG. 1.

FIGS. 1 and 2 illustrate a lawnmower 10 including a chassis 14, a seat 18 for an operator to sit in, a pair of control levers 22, front wheels 24 and rear wheels 26 supporting the chassis 14, a mower deck 30, and a deck lift assembly 32. In the illustrated embodiment, the lawnmower 10 is a belly-mount zero turn radius mower. The lawnmower 10 may also include a front mount mower. Although the illustrated lawnmower 10 is a riding lawnmower, it is possible to use a deck lift assembly on a walk-behind lawnmower or any other implement for which it is desirable to provide access to the underside of the chassis or deck, and the invention is therefore not limited to riding lawnmowers.

The illustrated deck lift assembly 32 includes a cylinder assembly 33 having an hydraulic cylinder 34 with a first end 38 fixed to a post or a pair of flanges 42 that are mounted to the chassis 14. A pair of bosses or ports 46 on the cylinder 34 receive hydraulic hoses for operation of the cylinder 34. The cylinder assembly 33 also includes a piston shaft 50 that extends out of a second end 52 of the cylinder 34 and reciprocates in response to hydraulic fluid being pumped into or removed from the cylinder 34. In this regard, the hydraulic cylinder 34 is preferably a double-acting cylinder.

FIG. 2 illustrates other aspects of the deck lift assembly 32. Threaded onto the end of the piston shaft 50 are a pair of jam nuts 54. The jam nuts 54 sandwich a disk 58. Extending from the disk 58 over the cylinder 34 is a height-of-cut strap 62. The top surface of the cylinder 34 includes markings corresponding to the height of the lawnmower deck 30. When viewed from above (e.g., from the position of one sitting in the seat 18), the end of the strap 62 aligns with the markings on the cylinder 34 and moves with the piston shaft 50 to indicate the height of the mower deck 30.

Also threaded onto the end of the piston shaft 50 is a rod end 66 having a bearing or ball joint. The deck lift assembly 32 includes a pivot member 68 having a first vertical link 70. The pivot member 68 is pivotally coupled to the chassis 14, and the piston shaft 50 is interconnected to the first vertical link 70 of the piston shaft 50. A bolt, pin, or other fastener extends through the joint and fastens the joint to the top end of the first vertical link 70. The pivot member 68 is connected to the mower lift shaft 74, and the first vertical link 70 is supported at its lower end by a mower lift shaft 74. The mower lift shaft 74 is supported for rotation with respect to the chassis 14 by a pair of nylon flange bushings 78. The first vertical link 70 is keyed, welded, fastened, or otherwise fixed for rotation with the mower lift shaft 74. The pivot member 68, first vertical link 70, and mower lift shaft 74 are thus pivoted about the mower lift shaft longitudinal axis in response to linear reciprocation of the piston shaft 50.

A horizontal lift assist rod 82 is pinned at a first end to the first vertical link 70 and pinned at a second end to a second vertical link 86. The second vertical link 86 is supported by a stub shaft 90 to which it is fixed for rotation, and the stub shaft 90 is supported for rotation with respect to the chassis 14 by nylon flange bushings 94. A pair of horizontal links 98 are fixed for rotation with the respective mower lift shaft 74 and stub shaft 90. At least one of the horizontal links 98 is connected to the pivot member 68. A length of chain 100 (FIG. 1) hangs from the free ends of the horizontal links 98 and is attached to the deck 30. A similar linkage is positioned at the other side of the lawnmower 10, and the same reference numerals are used for similar parts.

Through the above-described linkage, the deck 30 is raised in response to the piston shaft 50 being extended out of the hydraulic cylinder 34, and is lowered in response to the piston shaft being retracted into the hydraulic cylinder 34. A plurality of cylinder stops 102 are stored on a post 104 (FIG. 1) positioned generally behind the right leg of an operator of the lawnmower 10 when the operator is seated in the seat 18. The cylinder stops 102 may be attached to the piston shaft 50 and are sandwiched between the disk 58 and the end of the cylinder 34 to limit the extent to which the piston shaft 50 may be retracted into the cylinder 34.

Figure 3:
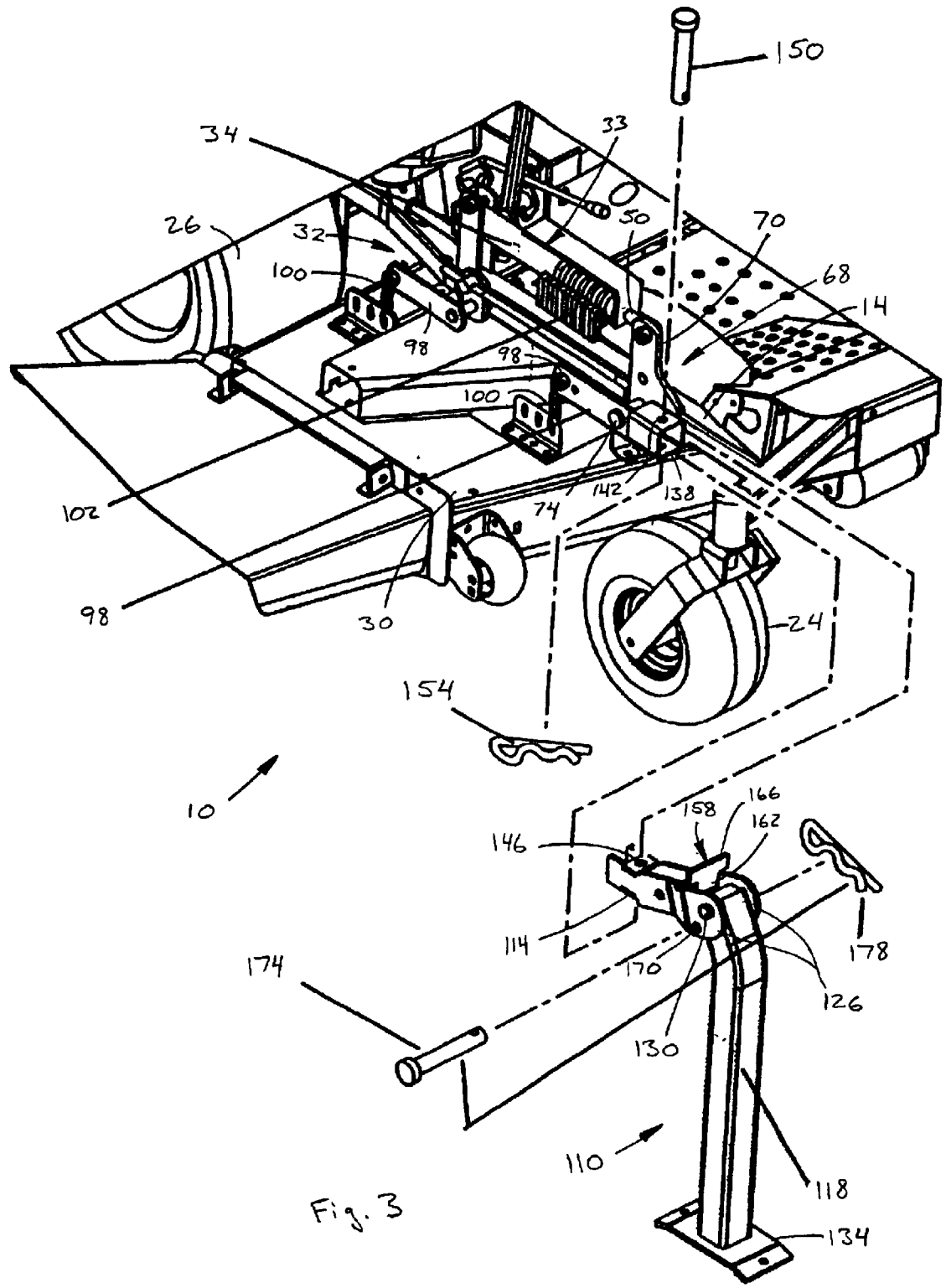
FIG. 3 is an enlarged view of a portion of the lawnmower of FIG. 1.

FIG. 3 illustrates a portion of the lawnmower 10 including a jack 110 having a jack connector 114 and a jack shaft 118. The jack connector 114 is pivotally coupled to the top end of the jack shaft 118. The jack connector 114 includes two flanges 126 that are substantially parallel to one another. Each flange 126 includes an aperture that aligns with an aperture in the top end of the jack shaft 118. A pivot pin 130 extends through the aligned apertures to pivotally couple the jack connector 114 to the jack shaft 118. A base 134 is connected to the bottom end of the jack shaft 118, and includes a surface area larger than the cross-sectional area of the jack shaft 118. The base 134 contacts the ground, or other surface, to provide a sturdy foundation when the jack 110 supports the lawnmower 10.

The pivot member 68 includes a link connector 138 supported by the mower lift shaft 74 near the end of the lift shaft 74 adjacent the first vertical link 70 and the horizontal link 98. The link connector 138 may be formed integral with the first vertical link 70 and horizontal link 98 and mounted to the mower lift shaft 74, or may be a separate portion fastened to the first vertical link 70, horizontal link 98, and mower lift shaft 74. The link connector 138, first vertical link 70, horizontal link 98, and mower link shaft 74 all pivot together about the same pivot axis. Since the link connector 138 is connected to the first vertical shaft 70 and the mower lift shaft 74, the link connector 138 is also pivoted about the mower lift shaft longitudinal axis in response to linear reciprocation of the piston shaft 50.

In FIG. 3, the link connector 138 is a hollow tubular portion having a substantially rectangular cross-section. The jack connector 114 is coupled to the link connector 138. In the illustrated embodiment, the jack connector 114 is inserted into the link connector 138, with the jack connector 114 including a male coupling portion, and the link connector 138 including a female coupling portion. This embodiment may be reversed, with the jack connector 114 including a female coupling portion, and the link connector 138 including a male coupling portion. Other similar coupling means may also be implemented to couple the jack connector 114 and link connector 138.

The link connector 138 includes connector apertures 142 in opposing faces of the link connector 138. The jack connector 114 also includes a connector aperture 146 extending through the jack connector 114. The connector apertures 142, 146 may be aligned, and a connector pin 150 may be inserted through the aligned connector apertures 142, 146 to secure the jack connector 114 to the link connector 138. A cotter pin 154 may be used to secure the connector pin 150 within the apertures 142, 146.

The jack shaft 118 includes a stop portion 158 extending from its top end. The stop portion 158 is substantially T-shaped and includes a narrow middle portion 162 extending between the flanges 126, and a wider upper portion 166 that projects outwardly beyond the width of the flanges 126. The stop portion 158 resists the jack connector 114 from pivoting upwardly beyond the stop portion 158.

The jack connector 114 includes lock apertures 170 in the flanges 126. When the jack connector 114 pivots upwardly far enough in relation to the jack shaft 118 to expose the lock apertures 170 from the jack shaft 118, a lock pin 174 may be inserted through the lock apertures 170. A cotter pin 178 may secure the lock pin within the lock apertures 170. The lock pin 174 resists the jack connector 114 from pivoting downwardly in relation to the jack shaft 118 and lowering the lawnmower 10. As the jack connector 114 pivots downwardly, the lock pin 174 may contact the side of the jack shaft 118 to resist the jack connector 114 from pivoting further in relation to the jack shaft 118. The lock pin 170 may be removed to lower the lawnmower 10.

As will be explained below, the above-described arrangement of parts permits the convenient movement of the lawnmower 10 between a lowered position, in which the wheels 24, 26 are at ground level, and a raised position, in which at least two of the wheels 24, 26 are raised off the ground. FIG. 4 illustrates the lawnmower 10 in the lowered position, and FIG. 5 illustrates the lawnmower 10 in the raised position. In the illustrated embodiment, the front wheels 24 and front end of the lawnmower 10 are raised off the ground when the cylinder assembly 33 is actuated. The two rear wheels 26 remain in contact with the ground, and the lawnmower 10 is raised to pivot on the rear wheels 26. Therefore, the chassis 14 is raised at an angle with respect to the ground overall, however, the front end of the chassis 14 is raised relatively higher than the rear portion of the chassis 14. In other constructions, the lawnmower 10 and jack 110 may raise just the rear wheels 26, one front wheels 24 and one rear wheel 26, or all wheels 24, 26 off the ground.

In operation, the lawnmower 10 is raised onto the jack 110 while the lawnmower 10 is substantially stationary in a horizontal direction. In order to raise the lawnmower 10 onto the jack. 110, the mower deck 30 is first lowered with respect to the chassis 14 so the jack 110 may be connected to the lawnmower 10. FIG. 4 illustrates the lawnmower 10 with the cylinder assembly 33 retracted, and the mower deck 30 lowered near the ground. The jack connector 114 is coupled to the link connector 138, and the base 134 is positioned on the ground surface. The linear actuation of the cylinder assembly 33 is converted into rotational movement by the pivot member 68. The pivotal movement of the pivot member 68 pivots the link connector 138 downwardly and pivots the horizontal link 98 upwardly with respect to the chassis 14. This simultaneously raises the mower deck 30 with respect to the chassis 14, and raises the chassis 14 (on the jack 110) with respect to the ground. The dual movement of the mower deck 30 and chassis 14 provides additional clearance for access under the lawnmower 10 and mower deck 30, and to a cutting blade 182 within the mower deck 30.

FIG. 5 illustrates the lawnmower 10 in the raised position. As the piston shaft 50 extends, the lawnmower 10 may be raised onto the jack 110 until the piston shaft 50 is fully extended, an operator stops the piston shaft 50, or until the flanges 126 of the jack connector 114 contact the stop portion 158. The locking pin 174 may be inserted through the locking apertures 170 to secure the jack 110 and lawnmower 10 in the raised position, and resist the lowering of the lawnmower 10. Additionally, cylinder stops 102 may be connected to the piston shaft 50, as shown in FIG. 3, to resist the lowering of the lawnmower 10 from the jack 110. The cylinder stops 102 are sandwiched between the disk 58 (FIG.

2) and the cylinder 34 to resist the piston shaft 50 from retracting into the cylinder 34, thereby lowering the lawnmower 10. When the lawnmower 10 is raised as shown in FIG. 5, the bottom portion of the lawnmower 10 and mower deck 30 may be accessed to change the cutting blade 182, clear obstructions from the mower deck 30, or perform other maintenance on the lawnmower 10.

The cylinder stops 102 (FIG. 3) and locking pin 174 may be removed to lower the lawnmower 10. The piston shaft 50 retracts into the cylinder 34, and pivots the pivot member 68 in a counter-clockwise direction, as shown in FIG. 5. As the pivot member 68 pivots, the link connector 138 and jack connector 114 also pivot with respect to the jack shaft 118 to lower the chassis 14 with respect to the ground surface. Simultaneously, the horizontal link 98 lowers the mower deck 30 with respect to the chassis 14. When the piston shaft 50 is retracted into the cylinder 34, the lawnmower 10 is in the lowered position and the front wheels 24 may contact the ground, as shown in FIG. 4. The jack connector 114 may then be disengaged from the link connector 138, and the jack 110 may be removed from the lawnmower 10.

The lawnmower 10 may include a lift transport mounted to the lawnmower 10 to store the jack 110 when not in use. The lift transport may be mounted to the front of the lawnmower 10, or onto a portion of the mower deck 30, or any other similar location that provides adequate space to store the jack 110. The jack 110 may be securely fastened to the lift transport.

In an alternate embodiment, the lawnmower 10 may includes two jacks 110 to raise the lawnmower 10. A second pivot member 68 may be coupled to the mower lift shaft 74 on the opposite side of the chassis 14, and a second jack 110 could engage the second pivot member 68. The second jack 110 would provide additional support for the lawnmower 10.

In the illustrated embodiment, the lawnmower includes a cylinder assembly 33 and a pivot member 68. Preexisting lawnmowers having a cylinder assembly 33, or other similar hydraulic system, may be modified to include a pivot member 68 or link connector to accommodate the jack 110. Therefore, the jack 110 may be utilized on preexisting lawnmowers as well as new lawnmowers 10 manufactured to accommodate the jack 110.

The foregoing detailed description describes only a few of the many forms that the present invention can take, and should therefore be taken as illustrative rather than limiting. It is only the claims, including all equivalents that are intended to define the scope of the invention.

What is claimed is:

1. A lawnmower comprising:
   a chassis;
   a mower deck movable with respect to the chassis;
   a cylinder assembly mounted to said chassis, the cylinder assembly including an actuating cylinder, and a piston shaft selectively extendable and retractable with respect to the cylinder under the influence of fluid pressure within the cylinder;
   a deck lift assembly interconnected to the chassis and the mower deck for adjusting the height of the mower deck with respect to the chassis, the deck lift assembly including a pivot member pivotally connected to the chassis and coupled to the piston shaft; and
   a jack removably coupled to the pivot member, such that the chassis is raised and lowered on the jack in response to movement of the piston shaft with respect to the cylinder.

2. The lawnmower of claim 1, wherein extension of the piston shaft raises the chassis on the jack, and retraction of the piston shaft lowers the chassis on the jack.

3. The lawnmower of claim 2, wherein the deck lift assembly includes a linkage for raising the mower deck with respect to the chassis in response to extension of the piston shaft.

4. The lawnmower of claim 1, wherein the lawnmower includes front wheels and rear wheels that support the chassis, and the pivot member is interconnected to the chassis near the front wheels, such that the front wheels are raised and lowered in response to movement of the piston shaft with respect to the cylinder.

5. The lawnmower of claim 1, wherein the jack includes a jack connector that engages the pivot member, and is pivotally coupled to a first end of a jack shaft.

6. The lawnmower of claim 5, further comprising a connector pin extending through the pivot member and jack connector to secure the jack connector to the pivot member.

7. The lawnmower of claim 5, wherein the jack shaft includes a base connected to a second end of the jack shaft opposite the first end, the base contacting a ground surface when the jack is raising or lowering the chassis.

8. The lawnmower of claim 5, wherein the pivot member includes a vertical link interconnected to the piston shaft, a horizontal link interconnected to the mower deck, and a link connector interconnected to the jack connector; and extension of the piston shaft with respect to the cylinder pivots tile vertical link away from the cylinder, pivots the horizontal link upwardly to raise the mower deck, and pivots the link connector downwardly to raise the chassis with respect to a ground surface.

9. The lawnmower of claim 8, wherein the downwardly pivot of the link connector causes the jack connector to pivot upwardly with respect to the jack shaft.

10. The lawnmower of claim 5, further comprising a locking pin removably insertable through the jack connector, and extending through the jack connector when the lawnmower is in a raised position to resist the jack connector from pivoting downwardly with respect to the jack shaft and lowering the lawnmower.

11. The lawnmower of claim 1, further comprising at least one cylinder stop connected to the piston shaft to resist the piston shaft from retracting and lowering the lawnmower.

12. A method for jacking a lawnmower comprising a chassis, a mower deck movably connected to the chassis, a cylinder assembly mounted to the chassis and including a cylinder and a piston shaft selectively extendable and retractable with respect to the cylinder under the influence of fluid pressure within the cylinder, and a deck lift assembly for adjusting the height of the mower deck with respect to the chassis in response to actuation of the cylinder assembly, the deck lift assembly including a pivot member that pivots in response to actuation of the cylinder assembly, the method comprising:
   providing a jack including a jack connector pivotally coupled to a jack shaft;
   connecting the jack connector to the pivot member;
   actuating the cylinder assembly to simultaneously raise the mower deck relative to the chassis and pivot the pivot member; and
   raising the chassis on the jack in response to pivoting the pivot member.

13. The method of claim 12, wherein the cylinder assembly includes a piston shaft and a cylinder, and wherein actuating the cylinder assembly includes extending the piston shaft out of the cylinder.

14. The method of claim 13, wherein the pivot member includes a vertical link interconnected to the piston shaft, a horizontal link interconnected to the mower deck, and a link connector interconnected to the jack connector, and wherein actuating the cylinder assembly includes extending the cylinder assembly to pivot the pivot member, thereby pivoting the vertical link away from the cylinder, pivoting the horizontal link upwardly to raise the mower deck, and pivoting the link connector downwardly to raise the chassis on the hack.

15. The method of claim 14, further comprising pivoting the jack connector upwardly with respect to the jack stand in response to pivoting the link connector downwardly.

16. The method of claim 13, further comprising connecting at least one cylinder stop to the piston shaft to resist the piston shaft from retracting and lowering the lawnmower.

17. The method of claim 12, further comprising raising the mower deck with respect to the chassis while simultaneously raising the chassis on the jack.

18. The method of claim 12, further comprising inserting a connector pin through the pivot member and jack connector to secure the jack connector to the pivot member.

19. The method of claim 12, further comprising inserting a locking pin through the jack connector when the lawnmower is in a raised position to resist the jack connector from pivoting downwardly with respect to the jack shaft and lowering the lawnmower.

20. The method of claim 12, further comprising lowering the mower deck with respect to the chassis by actuating the cylinder assembly and removing the jack connector from the pivot member.

21. A lawnmower comprising:
a chassis;
a mower deck supported by the chassis for movement with respect to the chassis;
a cylinder assembly coupled to the chassis and including an actuating cylinder, and a piston shaft selectively extendable and retractable with respect to the cylinder under the influence of fluid pressure within the cylinder;
a pivot member pivotally supported by the chassis and coupled to the mower deck and the cylinder assembly, the pivot member pivoting with respect to the chassis in response to at least one of extension and retraction of the cylinder assembly, the mower deck moving with respect to the chassis to adjust the height of the mower deck in response to pivotal movement of the pivot member; and
a jack removably coupled to the pivot member, the chassis being at least one of raised and lowered on the jack in response to pivotal movement of the pivot member, the mower deck moving with respect to the chassis and the chassis moving with respect to the jack simultaneously in response to pivotal movement of the pivot member.

22. The lawnmower of claim 21, wherein the mower deck moves upwardly with respect to the chassis and the chassis moves upwardly with respect to the jack in response to pivotal movement of the pivot member in a first rotational direction and the mower deck moves downwardly with respect to the chassis and the chassis moves downwardly with respect to the jack in response to pivotal movement of the pivot member in a second rotational direction opposite the first rotational direction.

* * * * *